3,333,920
STEAM TREATMENT OF COMPACTED
MURIATE OF POTASH
Victor A. Zandon, Milton H. Klein, and Norman R. Stewart, Carlsbad, N. Mex., assignors to American Metal Climax, Inc., New York, N.Y., a corporation of New York
Filed Apr. 6 1964, Ser. No. 357,505
3 Claims. (Cl. 23—89)

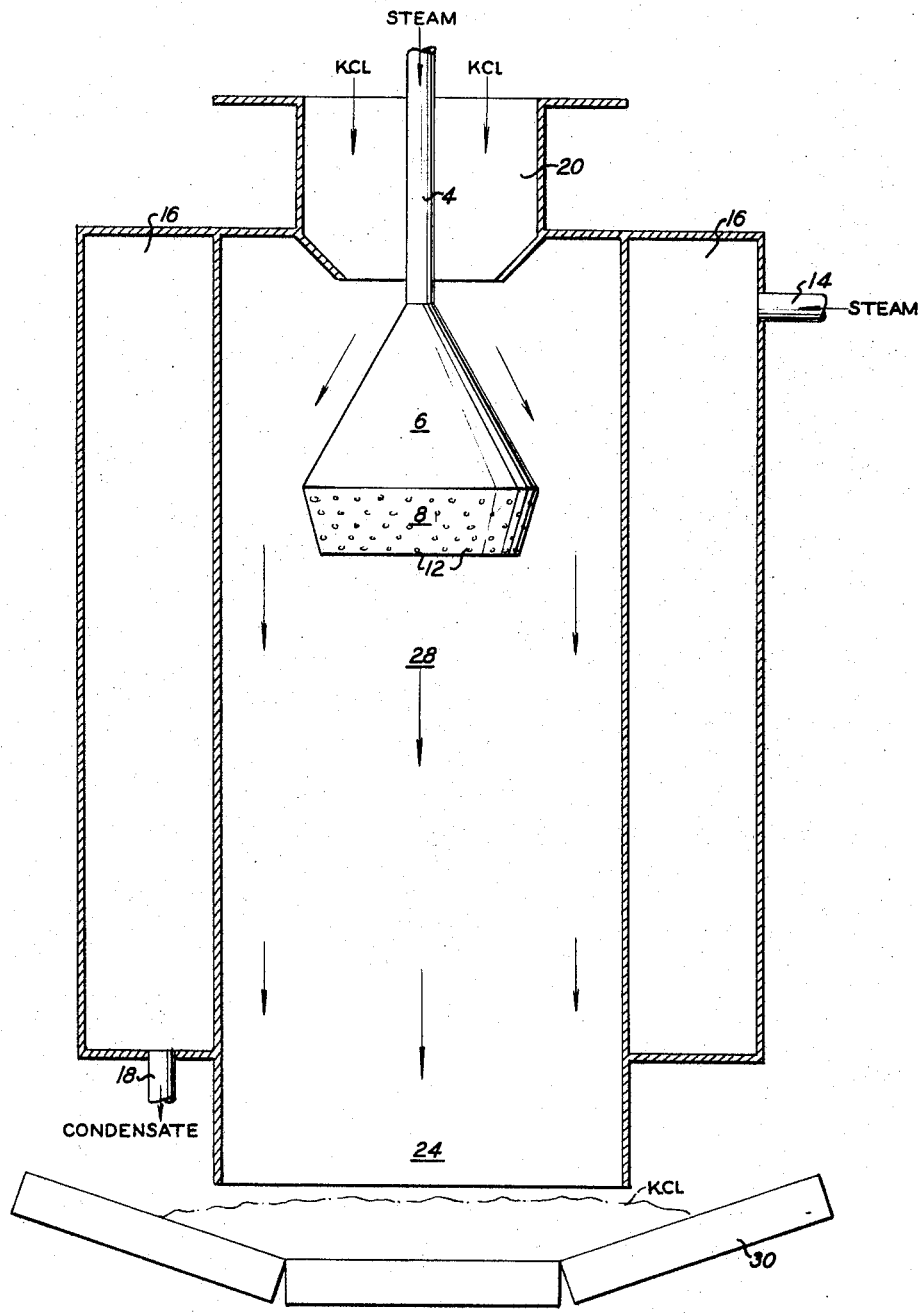

ABSTRACT OF THE DISCLOSURE

A method for treating compacted potassium chloride to reduce particle size diminution during subsequent handling. The method comprises exposing the particles to saturated steam and hydrating at least the surfaces of the particles. These particles retain their free-flowing characteristics even after hydrating.

---

This invention relates to new and useful improvements in the compaction upgrading of muriate of potassium fines and more particularly seeks to provide a method and apparatus to improve the size stability (i.e. prevent degradation or diminution in particle size) during shipping and storage of the compacted and granulated product.

Muriate of potash (the commonly accepted commercial name for what chemists refer to as "potassium chloride" or "KCl") is conventionally recovered from sylvinite ore by flotation that produces particles from 8 mesh to submicron size. This is divided into a coarse product of 28 mesh and above and a standard product from 28 to 200 mesh with the particles under 200 mesh being considered undesirable.

In recent years, the fertilizer industry has demanded a further granular grade of 14 to 6 mesh which has lead the potash producers to separate the minus 65 mesh from their standard grade, compress these fines into a sheet by running through rollers at high pressures, crush the sheet, tumble and screen out the granular 6 to 14 mesh grade while recycling the remainder.

The individual granules from this compaction process have a distinct angular shape with relative sharp edges (rounded somewhat by the tumbling) which are quite friable and have a tendency to break off in subsequent handling, e.g., conveying, loading, storage, etc. This gives rise to small amounts of objectionable fines from 20 to minus 200 mesh.

Various producers have attempted to overcome or minimize this particle size degradation or diminution. One process is to spray the product with a 2% starch solution and another applies a saturated KCl brine solution (U.S. Patent No. 3,026,194) to the product, but both of these processes require a subsequent drying step to drive off the excess moisture which is an added undesirable cost.

Therefore, it is an object of this invention to provide an improved method and apparatus to provide stability to the compacted and granulated particles of muriate of potassium.

It is a further object of this invention to provide a method and apparatus to produce such stability without adding a liquid or without subsequently drying same.

We have found that a more stable product is produced by contacting the granulated particles momentarily with saturated steam only and then passing the steamed product to storage without further processing. A preferred apparatus includes a ring sparger that ejects steam in a horizontal plane in all directions through a hollow circular stream of muriate of potash.

With these and other objects and features in mind, the nature of which will be more apparent, the invention will be more fully understood by reference to the drawing, the accompanying detailed description and the appended claims.

In the drawing:

The sole figure is a vertical cross-section taken through the steaming apparatus constructed in accordance with this invention.

As illustrated, the particular apparatus involves the ejection of saturated steam in a horizontal plane through a vertical stream of muriate but obviously the process could be practiced with other types of apparatus involving different planes, among other things.

Saturated steam passes through inlet 4 into sparger 6 which has the form of a cone. The sparger head 8 is provided with numerous openings 12 so that steam will escape in a circular pattern in a generally horizontal plane. Steam may also be passed optionally through inlet 14 into steam jacket 16 and through outlet 18 to prevent dissipation of heat from the functional portion of the apparatus, particularly in cold weather.

Compacted and granulated muriate that has been screened to the desired size (6 to 14 mesh) is dropped through the cylindrical inlet 20 to strike the conical sparger 6 to fall as a circular curtain through chamber 28 past the sparger head 8 into the discharge opening 24 and onto the conveyor belt 30 moving at 75 feet per minute. Obviously, the falling muriate is exposed only momentarily to the escaping steam. It is preferred to adjust the steam so as to completely consume same but an excess could be provided with means to separate and recycle or condense the excess.

Although the individual particles contact the steam for a short time only, the surface of each granule darkens in color. The KCl produced by flotation in the Carlsbad basin of New Mexico has a reddish brown color due to iron impurities. This color normally darkens when the crystals are dampened and also darkens with the present process. However, the present process is equally applicable to white KCl products in the absence of the convenient indicator. The moisture content is increased approximately from 0.10 to 0.50% by weight, i.e. the starting muriate will generally have from 0.05 to 0.15% moisture (considered herein as dry muriate) and the end product from 0.15 to 0.75% moisture. Moisture increase, however, can be misleading for at least two reasons. The present process is concerned only with a thin surface hydration so that particle size effects the moisture increase. Secondly, the KCl normally approaches this process as 175°–230° F. (depending on ambient temperature), which temperature is increased slightly by the steam exposure, so that the increase in moisture rapidly starts reducing by drying and in fact will approach its presteam moisture content during storage. Actually the peak moisture obtained in the process is difficult to determine as samples must be obtained immediately below the sparger head 8 and analyzed without any intermediate drying.

It is preferred to use saturated steam, i.e. containing some moisture, but dry steam is permitted if the KCl is below 200° F. since water would condense onto the crystal surfaces. Above this temperature, it is necessary to have moisture in the steam to effect the surface hydration. In either event, the steam is the medium for effecting the necessary surface hydration.

The product thusly threated requires no special drying stage, has no caking tendencies, and retains free-flowing characteristics for a long period of time, even though most of the added moisture is lost before shipment of the product.

The effectiveness of steam treatment was tested by comparing (1) a ten-day plant operation with steam as described herein with (2) the previous ten-day operation conventionally without steam. The Southwest Potash plant (Division of American Metal Climax, Inc.) has developed a standard degradation test for its granular production. A 24-hour composite sample is halved and one only tumbled in a laboratory cylindrical apparatus for 30 minutes. Then both samples are screen-sized and the net increase in minus 14 mesh material from the tumbling sample is arbitrarily considered the measure of degradation. In addition, laboratory tests were used to demonstrate the futility of an added special drying step with the instant process. Once again, a 24-hour composite sample was split with only one being dried for 5 hours at 135° C., each being split again for tumbling and non-tumbling before being screen-sized in the degration test. The following results were recorded:

Thus the plant degradation between steamed and unsteamed was reduced by more than 42%. The laboratory tests show no essential difference between the dried and undried product subsequent to the steaming process.

It is to be understood that the foregoing description is for purposes of illustration only and that various changes or modifications may be made in the disclosed process and apparatus without any departure from the spirit and scope of the invention.

We claim:

1. A method for treating compacted potassium chloride particles to reduce particle size diminution during subsequent handling which comprises hydrating at least the surface of said particles by momentarily exposing them to saturated steam in amounts sufficient to temporarily raise the moisture content about 0.1% to 0.5% based on the dry weight of said particles.

2. The method of claim 1 wherein said potassium chloride particles before said exposure to steam are at a temperature of about 175° F. to 230° F.

3. The method of claim 2 wherein said particles are above about 200° F. and said steam carries moisture.

| Mesh | Plant Operation ||||||| Lab. Operation |||||||
|---|---|---|---|---|---|---|---|---|---|---|---|---|
| | Steamed 0.21% $H_2O$ ||| Unsteamed 0.12% $H_2O$ ||| Steamed-Dried 0.04% $H_2O$ ||| Steamed-Undried 0.16% $H_2O$ |||
| | T | UT | C | T | UT | C | T | UT | C | T | UT | C |
| +8 | 36.8 | 40.1 | −3.3 | 34.3 | 38.1 | −3.8 | 33.2 | 36.3 | −3.1 | 32.9 | 35.7 | −2.8 |
| +10 | 87.7 | 90.2 | +0.8 | 84.0 | 89.1 | −1.3 | 79.7 | 82.9 | −0.1 | 80.7 | 83.3 | +0.2 |
| +14 | 96.5 | 98.0 | +1.0 | 94.5 | 97.3 | +2.3 | 98.4 | 99.2 | +2.4 | 98.4 | 99.3 | +1.7 |
| +20 | 97.7 | 98.8 | +0.4 | 96.1 | 98.3 | +0.6 | 99.2 | 99.9 | +0.1 | 99.1 | 99.9 | +0.1 |
| +35 | 98.3 | 99.3 | +0.1 | 97.1 | 99.0 | +0.3 | 99.3 | 99.9 | +0.1 | 99.2 | 99.9 | +0.1 |
| +65 | 98.8 | 99.6 | +0.2 | 97.8 | 99.4 | +0.3 | 99.3 | 99.9 | 0 | 99.3 | 99.9 | +0.1 |
| −65 | 1.2 | 0.4 | +0.8 | 2.2 | 0.6 | +1.6 | 0.7 | 0.1 | +0.6 | 0.7 | 0.1 | +0.6 |
| | Degrad. equals 1.5% ||| Degrad. equals 2.8% ||| Degrad. equals 0.8% ||| Degrad. equals 0.9% |||

T=Tumbled; UT=Untumbled—both reported in cumulative percent wt. C=Percent change.

References Cited

UNITED STATES PATENTS

| | | | |
|---|---|---|---|
| 376,409 | 1/1888 | Keyser | 23—184 |
| 845,189 | 2/1907 | Osborne | 23—287 |
| 1,060,805 | 5/1913 | Wiebe | 23—287 |
| 2,624,955 | 1/1953 | Robison | 34—37 X |
| 2,703,272 | 3/1955 | Fuchsman | 23—89 |
| 3,063,800 | 11/1962 | Dancy | 23—89 |
| 3,067,013 | 12/1962 | Lamb | 23—252 |
| 3,212,863 | 10/1965 | Goodenough et al. | 23—300 |
| 3,240,558 | 3/1966 | Heiss et al. | 23—89 |

OTHER REFERENCES

Hackh's Chemical Dictionary, Third Ed., Revised, 1944, pp. 256, 553 and 677. McGraw-Hill Book Co., Inc., N.Y.

Heslop & Robinson Book "Inorganic Chemistry," 1963 Edition, 2nd Edition Revised, p. 249, Elsevier Pub. Co., N.Y.

Supplement to Mellor's Comprehensive Treatis on Inorganic and Theoretical Chem., vol. 2, supp. III, Part 2, 1963 Ed., pp. 1670, 1672. John Wiley and Sons, Inc., N.Y.

OSCAR R. VERIZ, *Primary Examiner.*

E. STERN, *Assistant Examiner.*